United States Patent [19]
Bernett

[11] 4,346,558  
[45] Aug. 31, 1982

[54] THERMAL ACTUATOR WITH LOCK OPEN FEATURE

[75] Inventor: Thomas B. Bernett, Arlington Hts., Ill.

[73] Assignee: Eaton Corporation, Cleveland, Ohio

[21] Appl. No.: 149,865

[22] Filed: May 15, 1980

[51] Int. Cl.³ .............................................. F01B 29/10
[52] U.S. Cl. ...................................... 60/527; 169/37; 236/100
[58] Field of Search .................... 169/42, 57, 90, 37, 169/60, 19; 236/100; 92/23; 292/163; 60/527

[56] References Cited

U.S. PATENT DOCUMENTS

| | | | |
|---|---|---|---|
| 3,386,065 | 5/1968 | Algino | 236/100 |
| 4,187,683 | 2/1980 | Northrop, Jr. et al. | 169/42 |

*Primary Examiner*—Robert J. Spar
*Assistant Examiner*—Kenneth Noland
*Attorney, Agent, or Firm*—C. H. Grace; R. A. Johnston; J. G. Lewis

[57] ABSTRACT

A thermally responsive force generating device 10 is disclosed for use in operating fire extinguishing sprinkler valves. The device includes a temperature sensitive locking subassembly 18 mounted in an adapter member 14 which has a threaded portion for connection to a sprinkler valve. A thermal actuator 12 of the expansible wax type is connected to the adapter by a thin walled tubular member 16 which allows the thermal actuator to break away from the adapter if excessive force is generated thereby as a result of experiencing extremely high environmental temperatures. The locking assembly includes a spring biased locking pin 56 mounted in an opening in the adapter and held in an inoperative position by a fusible temperature sensitive insert 54. The insert will remain solid at temperatures below a predetermined value thus permitting an actuator output rod 38 to be moved to a retracted position under certain conditions. If the temperature exceeds the predetermined value the locking pin will be moved beneath a shoulder 42 formed on the output rod, thereby preventing the rod from retracting.

7 Claims, 3 Drawing Figures

U.S. Patent    Aug. 31, 1982    4,346,558
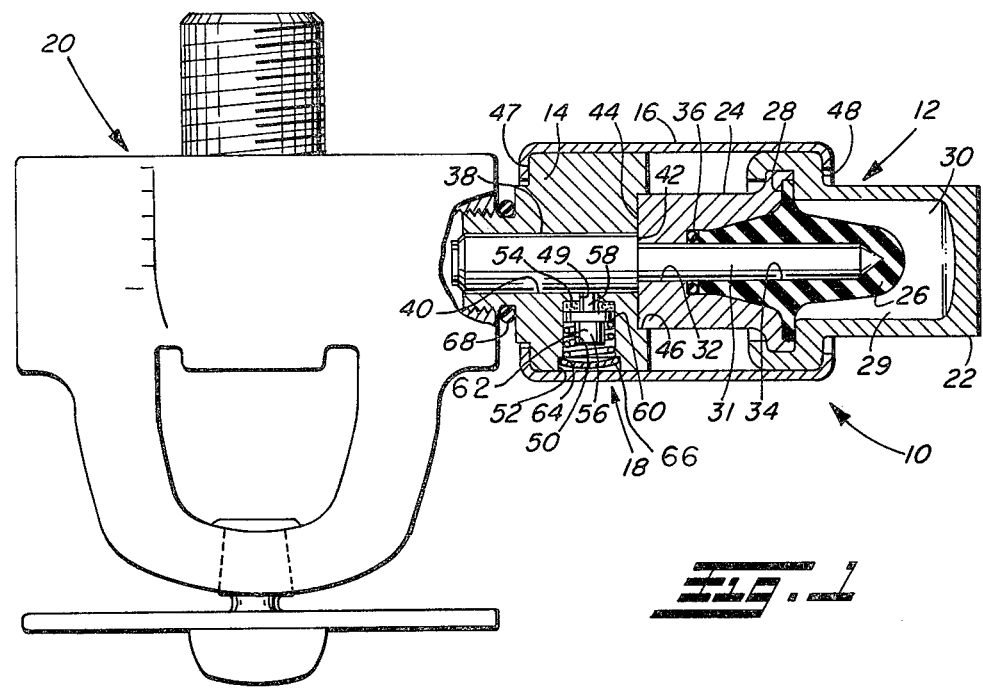
FIG. 1
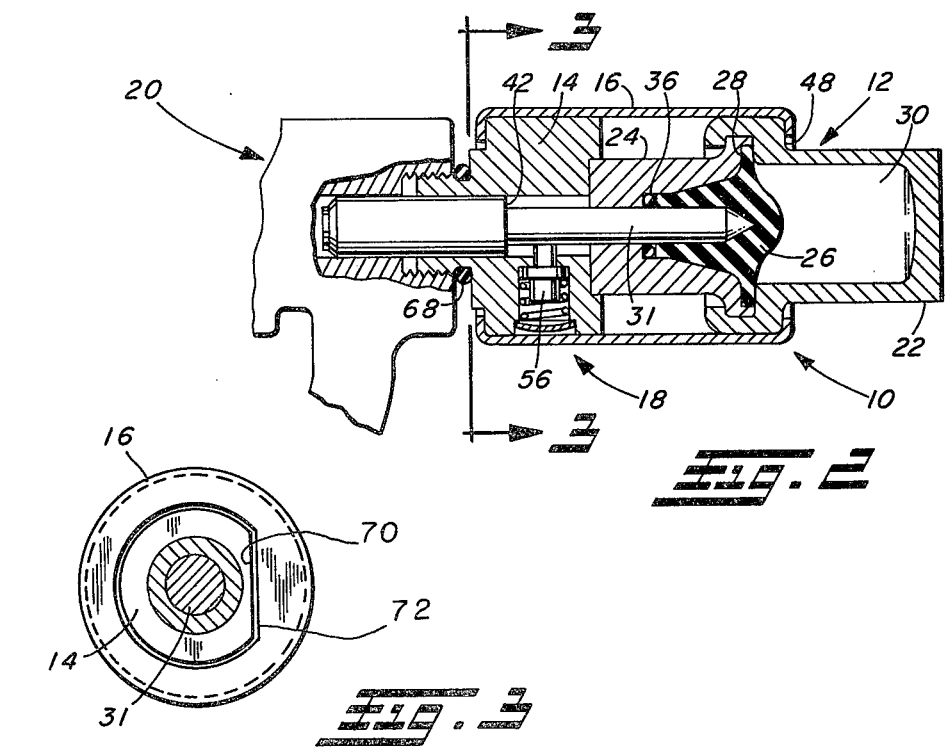
FIG. 2
FIG. 3

4,346,558

THERMAL ACTUATOR WITH LOCK OPEN FEATURE

BACKGROUND OF THE INVENTION

This invention relates to thermally responsive devices and is particularly suited for use in association with fire prevention sprinkler valves.

DESCRIPTION OF THE PRIOR ART

Thermally responsive devices are presently used in fire prevention systems for operating water sprinkler head valves. One known type of device incorporates an expansible wax-type actuator which produces outward movement of an output rod in response to the environment temperature exceeding a predetermined level. Movement of the rod actuates a valve member in the sprinker head to an open position allowing water flow through the valve. If the fire is extinguished and the temperature sensed by the device falls below the actuating temperature, the actuator output member will retract, thereby shutting off the sprinkler head valve and preventing further water damage to the building structure. If the temperature rises above a second predetermined value greater than the temperature necessary to actuate a temperature sensitive power element in the device, then the device will lock into an open position by means of a ball detent arrangement which locks against a shoulder formed on the actuator output rod. The ball is moved to the locked position by a tapered surface on a cage member which is biased upwardly by a spring. A temperature sensitive spacer is positioned at one end of the cage member and prevents movement of the cage which would move the ball into locking engagement with the output rod. The spacer is made of a fusible material formulated to melt at a temperature above the normal operating temperature of the power element thus allowing upward movement of the cage and tapered surface. As devices of the type described above are exposed to extremely high temperatures, the capsule containing the expansible wax compound used for powering the actuator expands and ruptures through a purposely weakened wall section in the capsule, thus allowing the compound to escape without further damage to the device. However, in the event the capsule containing the expansible wax compound fails to rupture, pressure developed by the wax compound can cause the sleeve to fail, thus allowing the capsule to fall away from the sprinkler head valve and negate the safety lock-up feature.

Thus a need has arisen for a temperature responsive device which will lock and remain in the open position in the event that the capsule containing the expansible wax compound fails to rupture.

SUMMARY OF THE INVENTION

In the present invention a thermally responsive device is provided which comprises an expansible wax compound type actuator having an output rod extending through a separate adapter member. The output rod is engageable with and operates a sprinkler head valve.

The actuator portion of the device is held in abutment against the adapter by a thin wall tubular section which is crimped over shoulder portions on the adapter and actuator.

A temperature responsive locking subassembly is mounted directly in the adapter member and includes a spring biased pin mounted in a transversely extending bore which intersects with a guide bore in the adapter through which the actuator output rod extends. A temperature sensitive, fusible insert is mounted between a shoulder on the pin and a shoulder intermediate concentric bores in the adapter and functions to prevent the locking pin from entering the guide bore. When the temperature exceeds a predetermined value, the insert melts allowing a portion of the locking pin to enter the guide bore. Prior to this, the output rod has been moved to its uppermost position by the thermal actuator. A shoulder on the rod abuts against the locking pin, thus preventing rod movement from the sprinkler valve open position thereby enabling the sprinkler valve to continue water dispersion.

It is therefore an object of the invention to provide a thermally responsive device having a means for locking the device in the actuated position at temperatures sensed above a predetermined value.

BRIEF DESCRIPTION OF THE DRAWINGS

FIG. 1 is a cross-sectional view of an embodiment of the invention mounted in association with a sprinkler head valve and shown in the unactuated position;

FIG. 2 is a view similar to FIG. 1 showing the device in the actuated position and with the locking pin in the locked position; and FIG. 3 is a cross-sectional view taken along lines 3—3 of FIG. 2 showing the torque limiting flat surface on the adapter and connecting sleeve.

DETAILED DESCRIPTION

Referring now to FIG. 1, there is shown a temperature responsive device, indicated generally at 10, embodying the principles of the invention having a thermal actuator indicated generally at 12, an adapter 14 connected to actuator 12 by a thin walled sleeve 16, and a temperature sensitive locking subassembly, indicated generally at 18, mounted in the adapter. Adapter 14 has a generally cylindrical configuration with a male threaded extension on the upper end for connection to a sprinkler head valve, indicated at 20. Valve 20 is of a construction known in the art used in fire prevention sprinkler systems in commercial and industrial buildings. It should be noted that device 10 is not limited to use in association with a sprinkler head valve but would also be suitable for actuating other components in response to temperature changes.

Thermal actuator 12 is powered by an expansible wax type compound and comprises a lower cup-shaped member 22 formed of a suitable heat conductive material, preferably copper, crimped around a lower flanged portion of an elongated guide casing 24. An elastomeric diaphragm 26 has an upper portion which closely conforms with a cavity in the guide casing and a lower portion which extends into cup 22. Diaphragm 26 includes an outer flanged portion 28 located midway along its length which is sealingly clamped between the flanged portions of the guide and cup.

A chamber 29 is defined by the lower surface of diaphragm 26 and the internal surfaces of cup 22. A copper flake and wax type expansible compound 30 is contained in chamber 29. The compound is formulated to melt and abruptly expand at a predetermined temperature. Expansion of compound 30 results in an upward force being applied to the lower surface of boot 26.

An actuator output rod 31 has a lower portion which extends through an opening 32 in guide casing 24 and an opening 34 in the boot. An anti-chafe ring 36 fits closely around the outer surface of rod 31 and is disposed between the upper end of the boot and a shoulder in the guide casing. Ring 36 functions to prevent chafing of the upper end of the boot during movement of the output rod.

Output rod 31 has an enlarged diameter portion 38 at its upper end which is guidedly received in a bore 40 formed in adapter 14. A shoulder 42 is formed on rod 31 and seats against a top surface 44 of guide casing 24 thereby defining the retracted position of the rod, as shown by FIG. 1.

The upper end of guide casing 24 is received in and located by a counterbore 46 formed in the lower end of adapter 14. Counterbore 46 is concentric with bore 40.

The upper and lower ends of sleeve 16 are crimped over upper and lower shoulder portions 47 and 48 formed on adapter 14 and cup 22, respectively.

A transversely extending opening is formed in adapter 14 and defined by first, second, and third concentric bores 49, 50, and 52.

Locking subassembly 18 is mounted within bores 49 through 52 and includes a washer shaped member 54 formed of a fusible material which liquifies above a second predetermined temperature higher than the melting point (120-140 degrees F.) of compound 30. In the preferred form of the invention washer 54 is an alloy of lead and tin which is formulated to melt at approximately 530 degrees F. It should be noted that alternative temperature sensitive materials such as thermoplastics or other fusible materials which change from a rigid state to a liquid or even vaporize at certain temperatures might also be used without departing from the scope of the invention. Washer 54 is received in bore 50 and seated against a shoulder intermediate bores 49 and 50.

A locking pin 56 has an upper portion 58 which extends through an opening in washer 54 and bore 49 and a flanged portion 60 which is guided by bore 50. Pin 56 includes a cylindrical portion 62 formed on its left end.

A biasing spring 64 has the upper portion thereof guided by cylindrical portion 62 and reacting against flange 60. A resilient retaining washer 66 is pressed into bore 52 and functions to hold the locking subassembly in position.

A seal ring 68 is received over the upper threaded end of adapter 14 and functions to fluidly seal the interface between valve 20 and adapter 14.

As shown by FIG. 3, flat surface portions 70 and 72 are formed on adapter 14 and sleeve 16, respectively, and function to limit the torque transmitted to the threaded connection between adapter 14 and sprinkler 20. During assembly of the device 10 to sprinkler 20 torque loading will be transferred from the sleeve flat to the adapter flat until the adapter flat deforms. The adaptor is fabricated from brass and thus will readily deform at a preselected design torque.

In operation, temperature sensitive device 10 will function to move output rod 31 upwardly in response to sensing temperatures above a predetermined value (120-140 degrees F.). The temperature at which actuator 12 responds is selected by design choice to meet the performance requirements of the associated component, for example, the sprinkler head valve 20 of FIG. 1. In the case of a sprinkler valve application, if temperatures in the environment continue to rise, fusible washer 54 is formulated to melt at a second predetermined temperature higher than the first temperature whereupon biasing spring 64 will move locking pin 56 rightward such that the right end extends into guide bore 40.

As shown by FIG. 2, output rod is positioned in a second extended position in which shoulder 42 is moved above the upper surface of bore 49. If, however, the temperature in the environment returns to a value below the first predetermined temperature without rising above the melting point of fusible washer 54, the output rod 31 will return to its retracted position as shown by FIG. 1.

If the temperature of compound 30 rises to an extreme level relative to the melting point of compound 30, damage to thermal actuator 12 could possibly occur resulting in bursting of cup 22 or over extension of rod 31 which could cause actuator 12 to tear away from sleeve 16 and adapter 14. In that event, locking subassembly 18 would still be effective for maintaining rod 31 in the second extended position thereby insuring that the sprinkler head valve 20 remains in the open position. This particular feature also gives a positive indication that device 10 did initially actuate the sprinkler head valve which is an important consideration after building fire damage in determining whether the sprinkler system was initially operative.

The embodiment of the invention as shown and described above is representative of the inventive principles stated herein. It is to be understood that variations and departures can be made from the embodiment as shown without, however, departing from the scope of the appended claims.

What is claimed is:

1. A temperature responsive force generating device, said device comprising:
  (a) thermally responsive actuator means, said actuator means including an output rod movable between first position and a second position;
  (b) adapter means, said adapter means including,
    (i) a member having a guide surface therein, said output rod received and guided by said surface, said member having a generally transversely extending surface defining a shoulder and intersecting with said guide surface; and
    (ii) means for connecting said member to said actuator means,
  (c) means for locking said output rod in said second position, said locking means associated with said member and including,
    (i) a pin movable in said transverse surface between a first position permitting movement of said actuator rod and a second position limiting movement of said actuator rod in at least one direction,
    (ii) means for biasing said pin toward said second position,
    (iii) a temperature sensitive fusible member disposed intermediate a portion of said pin and said shoulder for preventing movement of said pin to said second position at temperatures below a predetermined value, said fusible member permitting movement of said pin to said second position only at temperatures at and above said predetermined value.

2. The device as defined in claim 1, wherein said connecting means is a thin walled tubular member having an upper portion crimped over surface portions of said adapter member and a lower portion crimped over surface portions of said thermal actuator means.

3. The device as defined in claim 1, wherein said temperature responsive actuator means includes
   (i) a cup-shaped member,
   (ii) a guide casing having a guide bore formed therein, said guide casing connected to said cup-shaped member and defining in cooperation with said cup-shaped member a cavity,
   (iii) a resilient diaphragm received within said cavity, said diaphragm having a flanged portion sealingly clamped between said guide casing and said cup-shaped member, said diaphragm having an opening therein aligned with said guide bore,
   (v) an output rod having a lower portion extending through and guided by said guide casing and extending into said opening in said diaphragm,
   (vi) an expansible wax compound received in the space between said cup-shaped member and said diaphragm.

4. The device defined in claim 1, wherein said temperature sensitive fusible member melts at said predetermined temperature.

5. The device defined in claim 1, wherein said temperature sensitive fusible member includes a thermoplastic member sufficiently deformable at said predetermined temperature to permit movement of said pin.

6. A temperature responsive force generating device, said device comprising: (a) thermally responsive actuator means, said actuator means including an output rod movable between a first position and a second position;
   (b) adapter means, said adapter means including,
      (i) a member having a guide bore therein, said output rod received and guided by said bore, said member having a generally transversely extending opening intersecting with said guide bore, said opening being defined by,
         a first bore opening into said guide bore,
         a second bore concentric with said first bore, and
         a shoulder intermediate said first and second bores; and
      (ii) means for connecting said member to said actuator means, and
   (c) means for locking said output rod in said second position, said locking means associated with said member and including,
      (i) a pin having portions thereof received in said second bore and movable in said transverse opening between a first position permitting movement of said output rod and a second position limiting movement of said output rod in at least one direction,
      (ii) means for biasing said pin toward said second position, said biasing means including a spring having one end thereof reacting against said pin and received in said second bore, and means for retaining said spring in said second bore, and
      (iii) temperature sensitive means for preventing movement of said pin to said second position at temperatures below a predetermined value, said temperature sensitive means permitting movement of said pin to said second position only at temperatures at and above said predetermined value, said temperature sensitive means including a fusible member disposed intermediate said shoulder and portions of said pin.

7. A temperature responsive force generating device comprising:
   thermally responsive actuator means including an output rod movable between first and second positions;
   a member defining a guide bore for receiving said output rod, first and second concentric bores generally transversely opening into said guide bore, and a shoulder intermediate said first and second bores;
   means for connecting said member and actuator means; and
   means carried by said member for locking said output rod in said second position including (i) a pin having portions thereof received in said second bore and movable in said first and second bores between a first position permitting movement of said output rod and a second position limiting movement of said output rod in at least one direction, (ii) means for biasing said pin toward said second position including a spring received in said second bore reacting against said pin portions, and means for retaining said spring in said second bore, and (iii) a temperature sensitive fusible member disposed intermediate said shoulder and pin portions to permit movement of the pin to said second position only at temperatures equaling or exceeding a predetermined value.

* * * * *